US006527334B2

(12) United States Patent
Oliver

(10) Patent No.: US 6,527,334 B2
(45) Date of Patent: Mar. 4, 2003

(54) ONE PIECE CAB EXTENDER MOUNTING AND INTEGRATED GRAB HANDLE FOR A MOBILE VEHICLE

(75) Inventor: Steven A. Oliver, Fort Wayne, IN (US)

(73) Assignee: Intellectual Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 10/092,229

(22) Filed: Mar. 6, 2002

(65) Prior Publication Data

US 2002/0135205 A1 Sep. 26, 2002

Related U.S. Application Data

(60) Provisional application No. 60/277,499, filed on Mar. 21, 2001.

(51) Int. Cl.$^7$ .............................. B62D 35/00; B60J 1/00
(52) U.S. Cl. ................ 296/180.1; 296/183; 296/190.08
(58) Field of Search .......................... 296/180.1, 180.2, 296/183, 190.1, 190.08

(56) References Cited

U.S. PATENT DOCUMENTS

| 3,945,677 | A | * | 3/1976 | Servais et al. ................ 105/1.1 |
| 4,357,045 | A | * | 11/1982 | Kinford, Jr. ............... 296/180.2 |
| 4,611,796 | A | * | 9/1986 | Orr ............................... 180/903 |
| D291,872 | S | * | 9/1987 | Simons et al. ............ 296/180.2 |
| 4,750,772 | A | * | 6/1988 | Haegert ..................... 296/180.2 |
| 4,775,179 | A | * | 10/1988 | Riggs ....................... 296/180.2 |
| 4,883,307 | A | * | 11/1989 | Hacker et al. ........... 296/180.2 |
| 5,159,746 | A | * | 11/1992 | Saggese ................... 180/89.19 |
| 5,658,038 | A | * | 8/1997 | Griffin ...................... 296/180.1 |
| 5,836,640 | A | * | 11/1998 | Hurayt et al. ............ 296/180.2 |
| D424,496 | S | * | 5/2000 | Damon et al. ............. D12/196 |
| 6,267,434 | B1 | * | 7/2001 | Casillas ................... 296/180.1 |
| 6,428,084 | B1 | * | 8/2002 | Liss ......................... 296/180.3 |

* cited by examiner

Primary Examiner—D. Glenn Dayoan
Assistant Examiner—Patricia L. Engle
(74) Attorney, Agent, or Firm—Jeffrey P. Calfa; Neil T. Powell; Dennis Kelly Sullivan

(57) ABSTRACT

A mobile vehicle cab has cab extender pieces engaged to the cab rearwards relative to vehicle forward movement. The cab extenders act as extensions of the cab sides to provide aerodynamic efficiency to vehicle operation. A one-piece cab extender mounting and integrated grab handle is engaged to the rearward side of the cab and to the interior surface of the left side cab extender. The cab extender mounting and integrated grab handle contains a vertical handle portion that is integrated and between an approximately horizontal upper portion and an approximately horizontal lower portion.

10 Claims, 3 Drawing Sheets

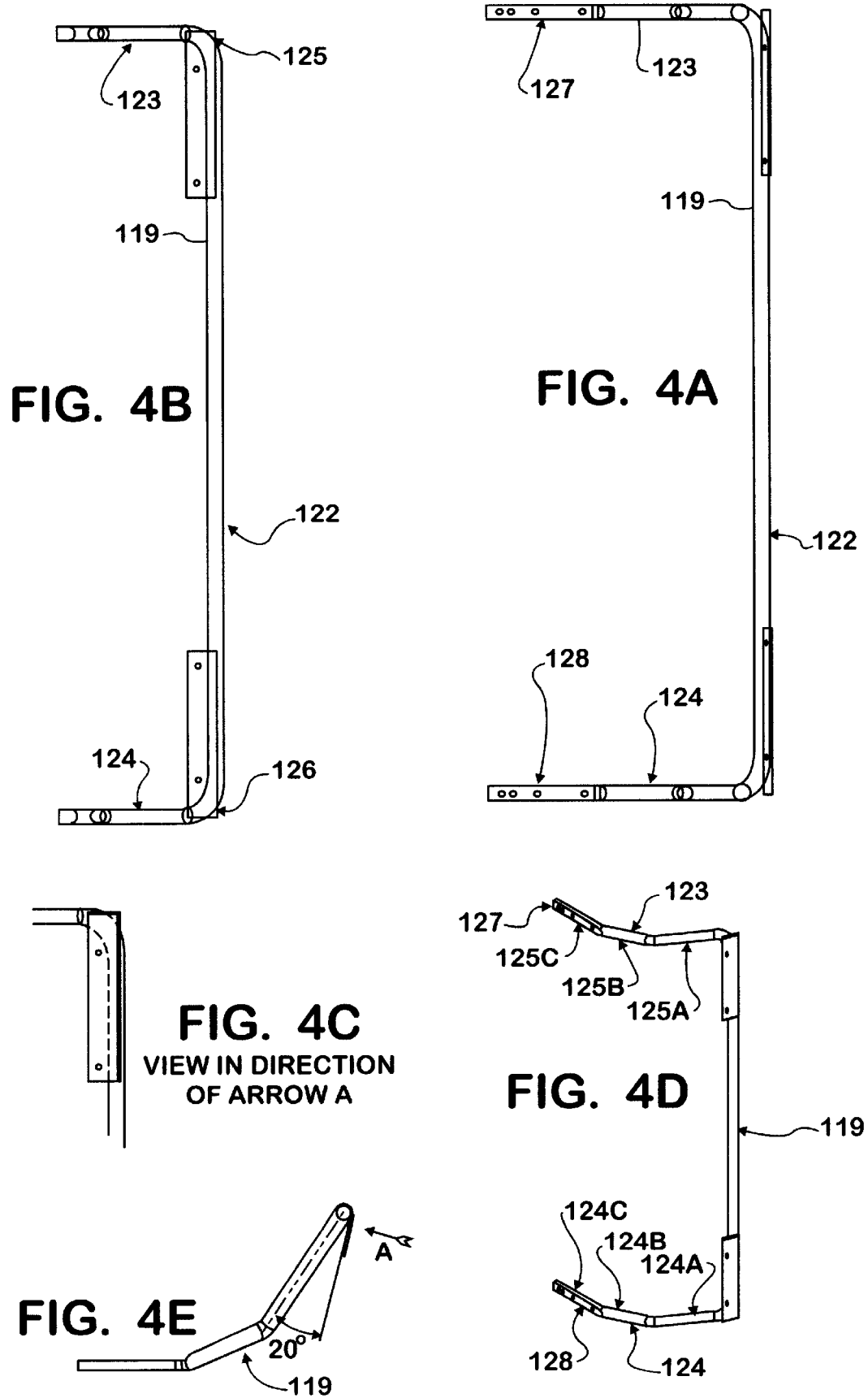

ONE PIECE CAB EXTENDER MOUNTING AND INTEGRATED GRAB HANDLE FOR A MOBILE VEHICLE

This is a non-provisional patent application claiming priority of provisional patent application Ser. No. 60/277,499, filed Mar. 21, 2001.

BACKGROUND OF INVENTION

This invention relates to a grab handle for facilitating access to the area rearward of a mobile vehicle cab where the vehicle cab has an extender. More specifically, the grab handle is a single piece integrated into the structural support and mounting bracket of the cab extender.

PRIOR ART

Commercial vehicles 201 such as medium and heavy-duty trucks sometimes have cab extender pieces 205 engaged to the rearward side 204 of the vehicle cab 202. See FIG. 1. The cab extender 205 provides aerodynamic efficiency to vehicle 201 operations. The cab extender 205 was previously mounted and supported by two mounting brackets 220 installed to the cab 202 rearward side 204 and on interior surfaces of the cab extender. Additionally, there was an angle reinforcement 221 located at an end area of the cab extender 205 and connected between the upper and lower mounting brackets 220, respectively. Grab handles 219 were needed to access the rearward side 204 of the cab 202 and also rearward and upper portions of the vehicle chassis to which the cab 202 is engaged. The prior art grab handle 219 was installed either on the angle reinforcement 221 or directly to the end surface of the cab extender 205. In either case, the prior art system involved complexity in assembly because there were more parts and also reduced strength due to the multiple engagement points between the various component parts. Additionally, the prior art grab handle 219 shown in FIG. 1 faces inwards from the cab extender 205 making it awkward to reach from the ground.

The commercial vehicle industry would greatly benefit from a durable single piece grab handle that is integrated into the mounting and structural support of the cab extender. It would be advantageous if the new grab handle can be made readily accessible from the ground to the side of the cab.

SUMMARY OF INVENTION

A primary object of the invention is to provide a durable single piece grab handle that is integrated into the mounting and structural support of the cab extender. The new grab handle is more readily accessible from the ground to the side of the cab. The invention satisfies this objective by having the cab extender mounting brackets mounted into a single piece that is integrated with the grab handle. The cab extender contains a cutout portion allowing the grab handle to be easily accessed from the ground and side of the vehicle.

DRAWINGS

FIG. 4A is a front view of the integrated grab handle of FIG. 2.

FIG. 4B is a side view of the integrated grab handle of FIG. 2.

FIG. 4E is a plan view of the integrated grab handle of FIG. 2.

FIG. 4C is a blown up view of Arrow A area of FIG. 4E.

FIG. 4D is a perspective view of the integrated grab handle of FIG. 2.

DETAILED DESCRIPTION OF THE INVENTION

Figure 2:
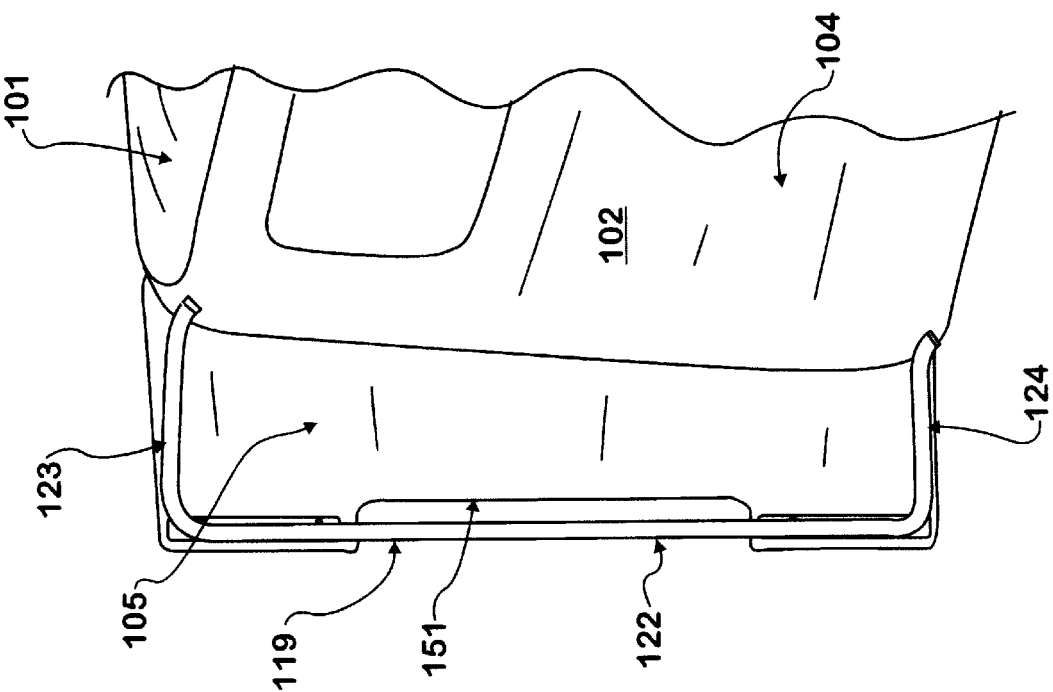
FIG. 2 is a rear perspective of a portion of a vehicle cab with cab extender with a grab handle integrated into the cab extender mounting and support components and made in accordance with this invention.
Figure 1:
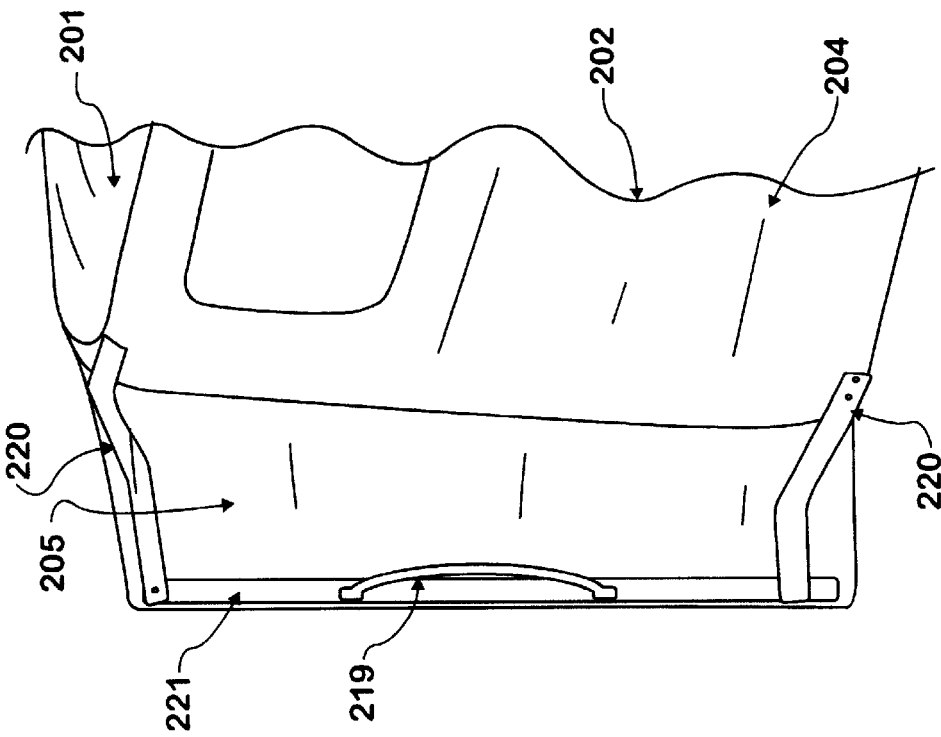
FIG. 1 is a rear perspective of a portion of a prior art vehicle cab with cab extender using the prior art grab handle and mounting components.
Figure 3:
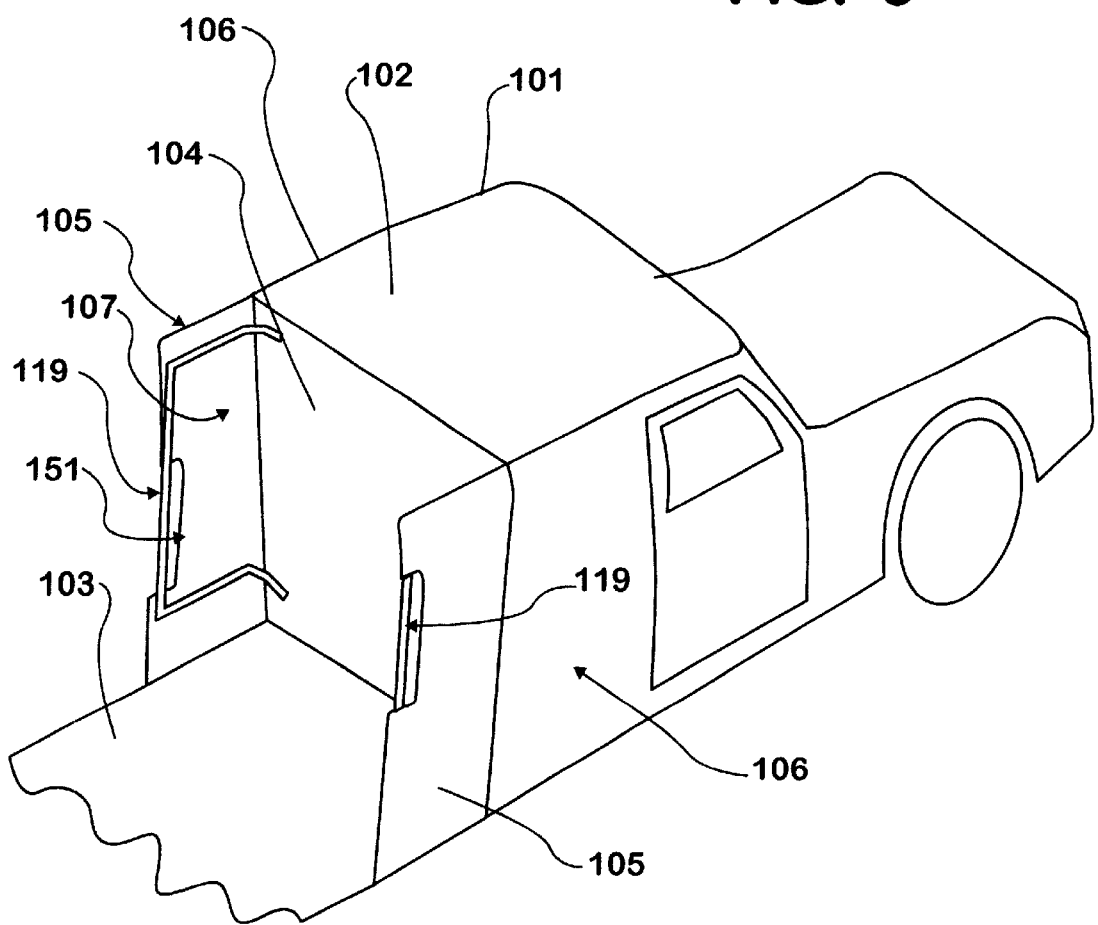
FIG. 3 is a rear perspective of a vehicle with the components of FIG. 2 installed.

The vehicle 101 shown in FIG. 3 has a cab 102 engaged to a chassis 103. The cab 102 has cab extender pieces 105 engaged to the cab rearwards relative to vehicle 101 forward movement. The cab extenders 105 act as extensions of the cab sides 106 to provide aerodynamic efficiency to vehicle 101 operation. A one piece cab extender mounting and integrated grab handle 119 is shown engaged to the rearward side 104 of the cab 102 and to the interior surface 107 of the left side cab extender 105. A similar cab extender mounting and integrated grab handle 119 is shown installed on the right side of the vehicle although a vehicle 101 could have such a component on only one side. The cab extender 105 contains a cutout portion 151 allowing a vertical handle portion 122 of the extender and integrated grab handle 119 to be easily accessed from the ground and side of the vehicle. The cutout portion 151 is at a height on the cab extender 105 such that an average sized individual standing on the ground and outboard the cab extender 105 can reach at least the bottom of the vertical handle portion exposed by the cutout portion 151. The cutout portion is at a height on the cab extender such that an average sized individual standing on the chassis 103 rearward of the cab 102 will not have to bend down to reach at least the top of the vertical handle portion 122 exposed by the cutout portion 151. The cutout portion 151 is shown with three sides defining a rectangular cutout however styling may dictate or allow the cutout 151 to be of other shapes so long as there is accessibility to the vertical handle portion 122 to average sized individuals while standing on the ground outboard of the cab extender 105 and while standing on the chassis 103 while rearward of the cab 102.

There is more detail on the cab extender mounting and integrated grab handle 119 and cab extender 105 and cab 102 shown in FIGS. 2 and 4A to 4E. The cab extender mounting and integrated grab handle 119 contains the vertical handle portion 122 that is integrated and between an approximately horizontal upper portion 123 and an approximately horizontal lower portion 124. There may be an upper extender mounting plate 125 engaged at the interface of the vertical handle portion 122 and the horizontal upper portion 123. There may also be a lower extender mounting plate 126 engaged at the interface of the vertical handle portion 122 and the horizontal lower portion 126. The respective extender mounting plates 125 and 126 are for engagement of the cab extender mounting and integrated grab handle 119 to the upper and lower portions of the cab extender 105. The horizontal lower portion 124 may be curved, straight, or made up of integrated relatively straight segments 124A, 124B, and 124C, as shown.

The horizontal upper portion 123 may be curved, straight, or made up of integrated relatively straight segments 125A, 125B, and 125C, as shown. The curvature or segments allow the respective horizontal upper and lower portions 123 and 124 to follow the aerodynamic contour of the cab extenders 105 providing support throughout. An end of the respective horizontal upper and lower portions 123 and 124 or at the last lower and upper straight segments 124C and 125C may contain cab-mounting plates 127 and 128. Where used the cab mounting plates 127 and 128 are used to engage the respective horizontal upper and lower portions 123 and 124 to the rearward side 104 of the cab 102.

The cab extender mounting and integrated grab handle 119 provides greater advantage than merely replacing multiple parts with a single part for ease of assembly. The single integrated piece provides greater support for a person accessing the rear upper chassis are 103 and the rearward side 104 of the cab 102 due to the direct mount to the cab. The cab extender 105 may be a piece of sheet metal, plastic, or fiberglass; hence, the prior art grab handles were not engaged as firmly as the handle of this invention. Additionally, the joining of the horizontal upper and lower portions 123 and 124 through the vertical handle portion 122 provides improved rigidity to the cab extender 105.

As described above, the one piece cab extender mounting and integrated grab handle 119 and cab extender 105, and the vehicle 101 with these components installed provide a number of advantages, some of which have been described above and others of which are inherent in the invention. Also modifications may be proposed to the one piece cab extender mounting and integrated grab handle 119 and cab extender 105, and the vehicle 101 with these components installed without departing from the teachings herein.

I claim:

1. A mobile vehicle for operation on the ground, comprising:
   a cab engaged to a chassis;
   said cab has cab extender pieces engaged to a rearward side of said cab;
   one-piece cab extender mounting and integrated grab handles engaged to said rearward side of said cab and to an interior surface of said cab extender pieces;
   said cab extender pieces contain a cutout portion at a height on said cab extender pieces to allow a vertical handle portion of said cab extender mounting and integrated grab handles to be accessed from the ground and from area on said chassis rearward of said rearward side of said cab; and
   said cab extender mounting and integrated grab handles providing structural support to said cab extender pieces through engagement to upper and lower portions of said cab extender pieces and said engagement to upper and lower portions of said cab.

2. The vehicle of claim 1 wherein:
   said cab extender mounting and integrated grab handle containing said vertical handle portion;
   said vertical handle portion integrated to as one-piece with and between an approximately horizontal upper portion and an approximately horizontal lower portion; and
   said horizontal upper and lower portions engaged to upper and lower portions of said cab.

3. The vehicle of claim 2, wherein:
   an upper extender mounting plate is engaged at an interface of said vertical handle portion and said horizontal upper portion of said cab extender mounting and integrated grab handle;
   a lower extender mounting plate is engaged at an interface of said vertical handle portion and said horizontal lower portion of said cab extender mounting and integrated grab handle; and
   said respective extender mounting plates engaging said cab extender mounting and integrated grab handle to upper and lower portions of said cab extender pieces.

4. The vehicle of claim 3, wherein:
   said horizontal upper and lower portions may be curved to approximate an inner contour of said cab extender.

5. The vehicle of claim 3, wherein:
   said horizontal upper and lower portions may be comprised of integrated relatively straight segments to approximate an inner contour of said cab extender.

6. A one-piece cab extender mounting and integrated grab handle in combination with a cab extender for installation on a mobile vehicle for operation on the ground, the vehicle having a cab engaged to a chassis, comprising:
   a cab extender piece for engagement to a rearward side of the cab;
   a one-piece cab extender mounting and integrated grab handle for engagement to the rearward side of the cab;
   said one-piece cab extender mounting and integrated grab handle engaged to an interior surface of said cab extender piece;
   said cab extender piece containing a cutout portion at a height on said cab extender piece to allow upon installation on the vehicle a vertical handle portion of said extender mounting and integrated grab handle to be accessed from the ground and from an area on the chassis rearward of the rearward side of the cab; and
   said cab extender mounting and integrated grab handle providing structural support to said cab extender piece through engagement to upper and lower portions of said cab extender and said engageability to upper and lower portions of the cab.

7. The combination of claim 5, wherein:
   said cab extender mounting and integrated grab handle contains said vertical handle portion;
   said vertical handle portion integrated as one-piece with and between an approximately horizontal upper portion and an approximately horizontal lower portion; and
   said horizontal upper and lower portions for engagement to upper and lower portions of the cab.

8. The combination of claim 7, wherein:
   an upper extender mounting plate is engaged at an interface of said vertical handle portion and said horizontal upper portion of said cab extender mounting and integrated grab handle;
   a lower extender mounting plate is engaged at an interface of said vertical handle portion and said horizontal lower portion of said cab extender mounting and integrated grab handle; and
   said respective extender mounting plates engaging said cab extender mounting and integrated grab handle to upper and lower portions of said cab extender piece.

9. The combination of claim 8, wherein:
   said horizontal upper and lower portions may be curved to approximate an inner contour of said cab extender.

10. The combination of claim 8, wherein:
   said horizontal upper and lower portions may be comprised of integrated relatively straight segments to approximate an inner contour of said cab extender.

* * * * *

UNITED STATES PATENT AND TRADEMARK OFFICE
CERTIFICATE OF CORRECTION

PATENT NO. : 6,527,334 B2
DATED : March 4, 2003
INVENTOR(S) : Steven A. Oliver

It is certified that error appears in the above-identified patent and that said Letters Patent is hereby corrected as shown below:

Title page,
Item [73], should read -- [73] International Truck Intellectual Property Company, L.L.C., Warrenville, IL (US) --

Signed and Sealed this

Twenty-first Day of October, 2003

JAMES E. ROGAN
*Director of the United States Patent and Trademark Office*